(12) United States Patent
Matsudo

(10) Patent No.: US 11,092,229 B2
(45) Date of Patent: Aug. 17, 2021

(54) VEHICLE

(71) Applicant: Yamaha Hatsudoki Kabushiki Kaisha, Shizuoka-ken (JP)

(72) Inventor: Shinichi Matsudo, Shizuoka (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 158 days.

(21) Appl. No.: 16/691,498

(22) Filed: Nov. 21, 2019

(65) Prior Publication Data

US 2020/0208731 A1 Jul. 2, 2020

(30) Foreign Application Priority Data

Dec. 28, 2018 (JP) .............................. JP2018-248560

(51) Int. Cl.
| | |
|---|---|
| *B60K 5/00* | (2006.01) |
| *F16H 57/04* | (2010.01) |
| *F02M 35/10* | (2006.01) |
| *F02M 35/02* | (2006.01) |
| *B60N 2/38* | (2006.01) |
| *B60K 17/04* | (2006.01) |
| *B60N 2/75* | (2018.01) |
| *B60K 20/06* | (2006.01) |
| *F02M 35/16* | (2006.01) |

(Continued)

(52) U.S. Cl.
CPC ........... *F16H 57/0416* (2013.01); *B60K 5/00* (2013.01); *B60K 17/04* (2013.01); *B60K 20/06* (2013.01); *B60K 37/04* (2013.01); *B60N 2/38* (2013.01); *B60N 2/793* (2018.02); *F02M 35/0204* (2013.01); *F02M 35/024* (2013.01); *F02M 35/10144* (2013.01); *F02M 35/162* (2013.01); *B60K 2005/003* (2013.01); *F16H 9/04* (2013.01)

(58) Field of Classification Search
CPC ......... F16H 7/0416; F16H 9/04; B60N 2/793; B60N 2/38; B60K 5/00; B60K 17/04; B60K 20/06; B60K 37/04; B60K 2005/003; F02M 35/0204; F02M 35/024; F02M 35/10144; F02M 35/162
See application file for complete search history.

(56) References Cited

U.S. PATENT DOCUMENTS

| | | | | |
|---|---|---|---|---|
| 8,613,335 B2 * | 12/2013 | Deckard | ................... | B23P 6/00 180/68.3 |
| 2011/0240393 A1 * | 10/2011 | Hurd | .................. | B60G 21/0551 180/233 |

(Continued)

*Primary Examiner* — Syed O Hasan
(74) *Attorney, Agent, or Firm* — HEA Law PLLC

(57) ABSTRACT

A vehicle that can realize measures for water exposure of intake ducts by a simple configuration is provided. The vehicle has a front seat, an engine and a continuously variable transmission at least partially located on a rear side of a front-end of the front seat and a bottom side of a lower end of the front seat, intake ducts at least partially extending from a rear side toward a front side on the bottom side of the lower end of the front seat, having intake ports in front-end portions, and sending outside air taken in from the intake ports to the continuously variable transmission, and a front cover covering both the front-end portions of the intake ducts, wherein the front-end portions of the intake ducts are located on a front side of the front-end of the front seat and a top side of the lower end of the front seat.

13 Claims, 12 Drawing Sheets

(51) Int. Cl.
  *F02M 35/024* (2006.01)
  *B60K 37/04* (2006.01)
  *F16H 9/04* (2006.01)

(56) References Cited

U.S. PATENT DOCUMENTS

2016/0332676 A1* 11/2016 Miller .................... B60G 11/48
2019/0061522 A1* 2/2019 Oba ....................... B60K 17/04

* cited by examiner

VEHICLE

CROSS-REFERENCE TO RELATED APPLICATION

The present application claims priority from Japanese application JP2018-248560 filed on Dec. 28, 2018, the content of which is hereby incorporated by reference, in its entirety, into this application.

BACKGROUND OF THE INVENTION

Field of the Invention

This invention relates to a vehicle.

Description of the Related Art

The specification of Publication of US Patent Application 2016/0332676 discloses a vehicle having a continuously variable Transmission (CVT) and including two air intake ducts connected to the continuously variable transmission.

In the vehicle disclosed in the specification of Publication of US Patent Application 2016/0332676, measures for water exposure for suppressing entry of water from intake ports of the intake ducts are necessary in case the vehicle travels on uneven ground. In the vehicle of the specification of Publication of US Patent Application 2016/0332676, one intake duct has the intake port located on the front side of the passenger seat and the other intake duct has the intake port located on the rear side of the passenger seat. As described above, the intake ports of the two intake ducts are provided in separate locations, and thereby, respective different measures for water exposure are necessary for the two intake ducts. Specifically, in the vehicle of US Patent Application 2016/0332676, the intake port located on the front side of the passenger seat is covered by a front cover and the intake port located on the rear side of the passenger seat is covered by a filter as the measures for water exposure. When the respective different measures for water exposure are taken with respect to each intake duct, the number of parts may increase and the configuration of the vehicle may become more complex.

SUMMARY OF THE INVENTION

One of the purposes of this disclosure is to provide a vehicle that can realize measures for water exposure for an intake duct by a simple configuration.

(1) A vehicle proposed in this disclosure includes a seat on which a driver sits, an engine at least partially located on a rear side of a front-end of the seat and a bottom side of a lower end of the seat, a continuously variable transmission at least partially located on the rear side of the front-end of the seat and the bottom side of the lower end of the seat, and varying and outputting rotary power from the engine, a first intake duct at least partially extending from a rear side toward a front side on the bottom side of the lower end of the seat, and having a first intake port in a front-end portion, and sending outside air taken in from the first intake port to the continuously variable transmission, a second intake duct at least partially extending from the rear side toward the front side on the bottom side of the lower end of the seat, having a second intake port in a front-end portion, and routing the outside air taken in from the second intake port to the continuously variable transmission, and one or more covers covering both the front-end portion of the first intake duct and the front-end portion of the second intake duct, wherein the front-end portion of the first intake duct and the front-end portion of the second intake duct are located on a front side of the front-end of the seat and top side of the lower end of the seat. According to the vehicle, measures for water exposure of the intake ducts may be realized by the simple configuration.

(2) In the vehicle according to (1), the first intake port and the second intake port may be provided at heights crossing a common horizontal plane. According to the configuration, the first intake port and the second intake port are placed near each other, and the same measures for water exposure may be taken for the first intake port and the second intake port.

(3) In the vehicle according to (1), the front-end portion of the first intake duct and the front-end portion of the second intake duct maybe placed to cross a common plane along a left-right direction. According to the configuration, the first intake port and the second intake port are placed near each other, and the same measures for water exposure maybe taken for the first intake port and the second intake port.

(4) In the vehicle according to (1), a direction in which the first intake port opens and a direction in which the second intake port opens may be different. According to the configuration, the continuously variable transmission may be cooled more effectively.

(5) In the vehicle according to (1), an exhaust duct having a connection port connected to a case of the continuously variable transmission in a front-end portion, having an exhaust port in a rear-end portion, and exhausting a gas within the case of the continuously variable transmission to outside of the continuously variable transmission via the connection port and the exhaust port may be provided.

(6) In the vehicle according to (1), an air cleaner having a third intake port for taking in the outside air and sending the outside air taken in from the third intake port to the engine via a third intake duct may be provided, and the air cleaner may be provided on the front side of the front-end portion of the first intake duct and the front-end portion of the second intake duct. According to the configuration, the clean outside air not at a high temperature may be routed to the engine.

(7) In the vehicle according to (6), the third intake duct may at least partially extend from the rear side toward the front side on the bottom side of the lower end of the seat.

(8) In the vehicle according to (6), an upper end of the first intake port may be provided on a top side of an upper end of the third intake port. According to the configuration, entry of water into the first intake duct may be suppressed.

(9) In the vehicle according to (1), the one or more covers may include a front cover forming a part of an exterior of a vehicle body.

(10) In the vehicle according to (9), a dashboard placed on the front side of the seat may be provided, and the one or more covers may include an inner cover which is covered by the front cover and attached to a front part of the dashboard.

(11) In the vehicle according to (10), the inner cover may form an open space, opening in a lower part with the front part of the dashboard, and the front-end portion of the first intake duct and the front-end portion of the second intake duct may be placed within the open space.

(12) In the vehicle according to (1), a center console adjacent to the seat with a select lever for changing a transmission ratio of the continuously variable transmission provided therein may be provided, and the first intake duct and the second intake duct may at least partially extend immediately below the center console.

(13) In the vehicle according to (1), the front-end portion of the first intake duct and the front-end portion of the second intake duct may be connected to each other.

BRIEF DESCRIPTION OF THE DRAWINGS

The present invention is illustrated by way of example and not limited in the figures of the accompanying drawings in which like references indicate similar elements.

DETAILED DESCRIPTION OF THE INVENTION

As below, an embodiment of the invention (hereinafter, also referred to as "the embodiment") will be explained with reference to the drawings. The embodiment should be understood as an example and the invention is not limited to the embodiment to be described using the drawings. The scope of the invention includes other embodiments having the same or similar advantages as or to those of the embodiment.

In the following explanation and respective drawings, the front side is shown by Y1, the rear side is shown by Y2, the right side is shown by X1, the left side is shown by X2, the top side is shown by Z1, and the bottom side is shown by Z2. Note that the directions are directions as seen from a driver in a vehicle 1.

Figure 1:
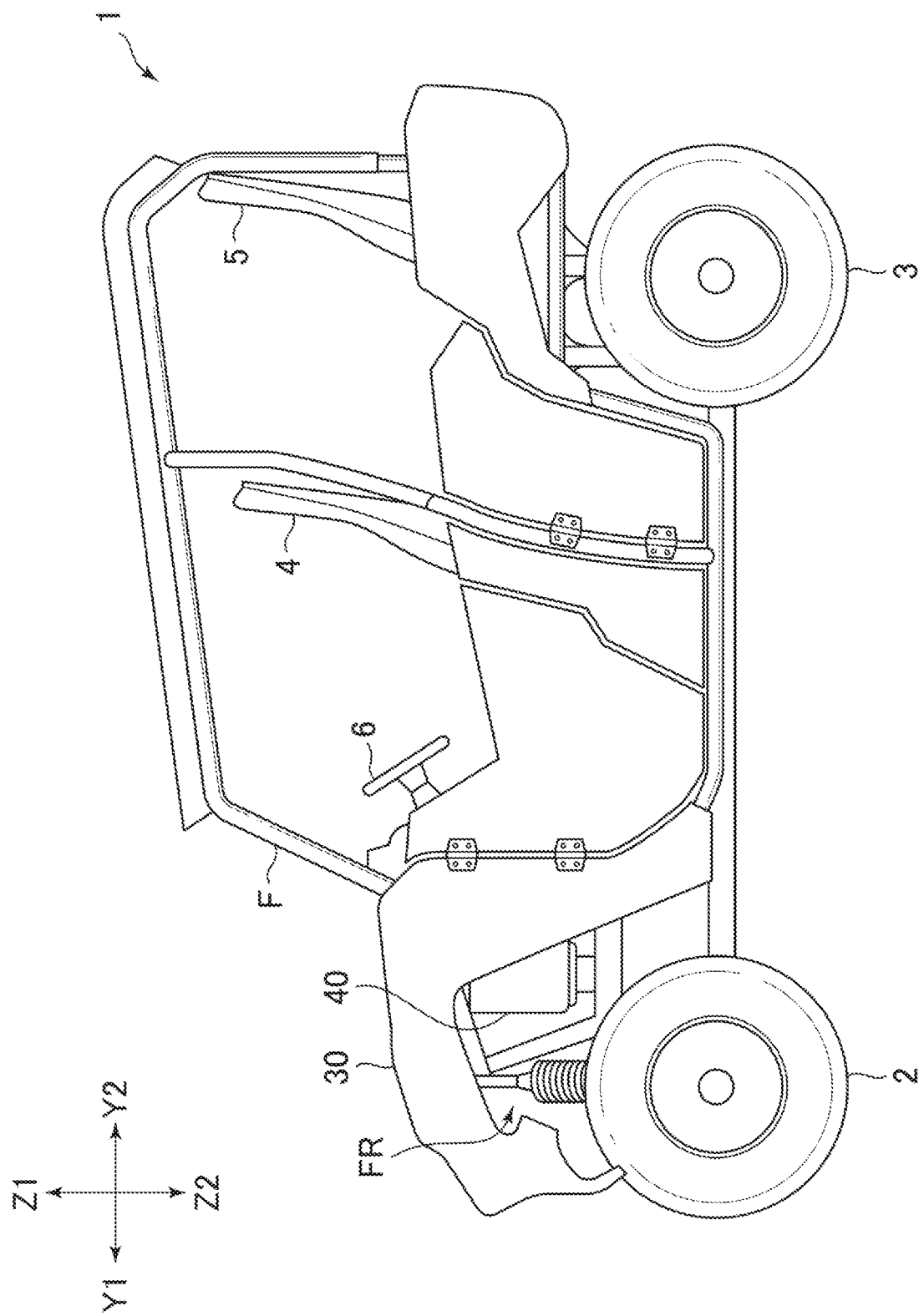
FIG. 1 is a side view of a vehicle from the left.
Figure 2:
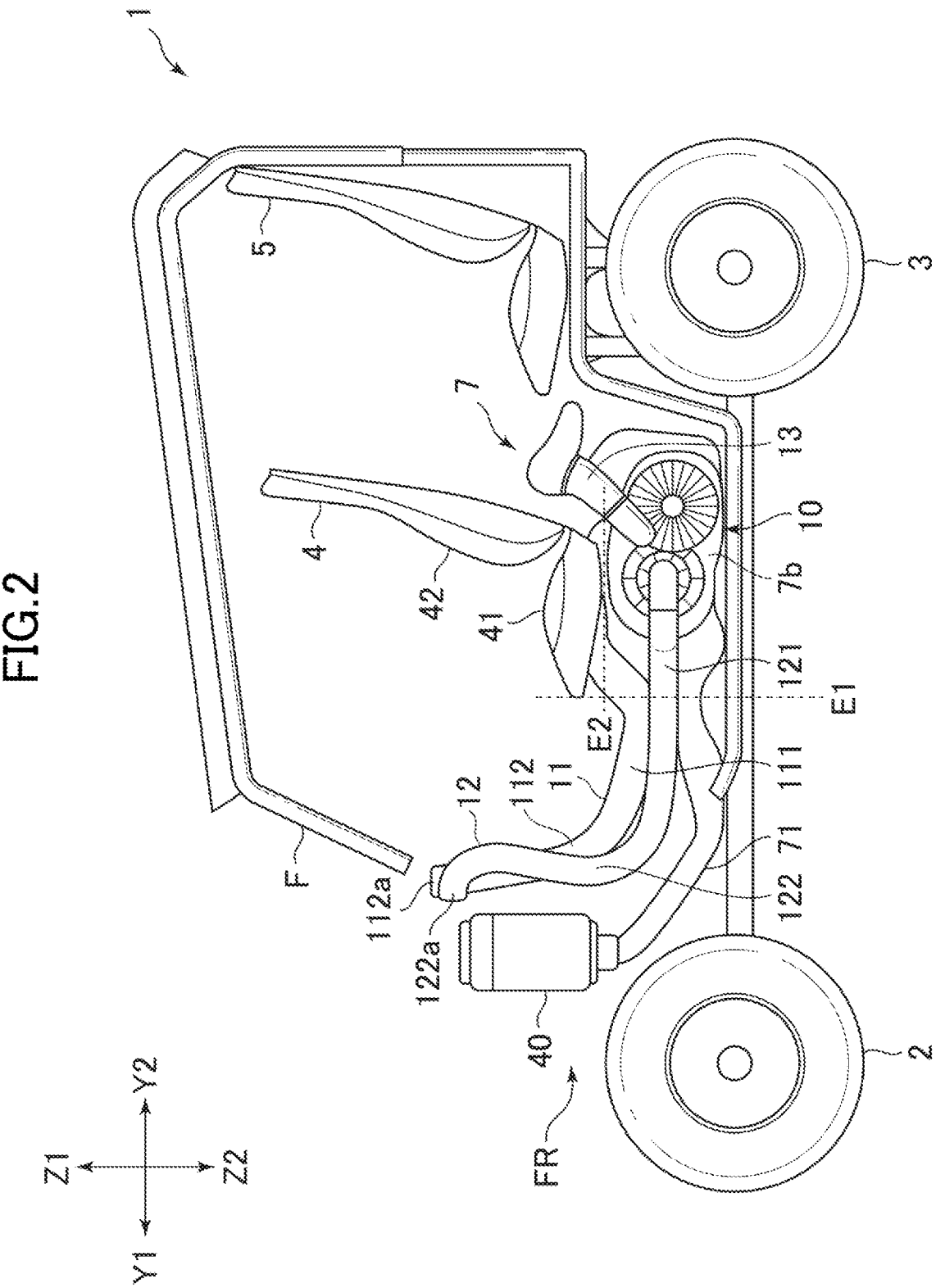
FIG. 2 is a side view of the vehicle from the left showing an engine unit (a part of the configuration of the vehicle is omitted).
Figure 3:
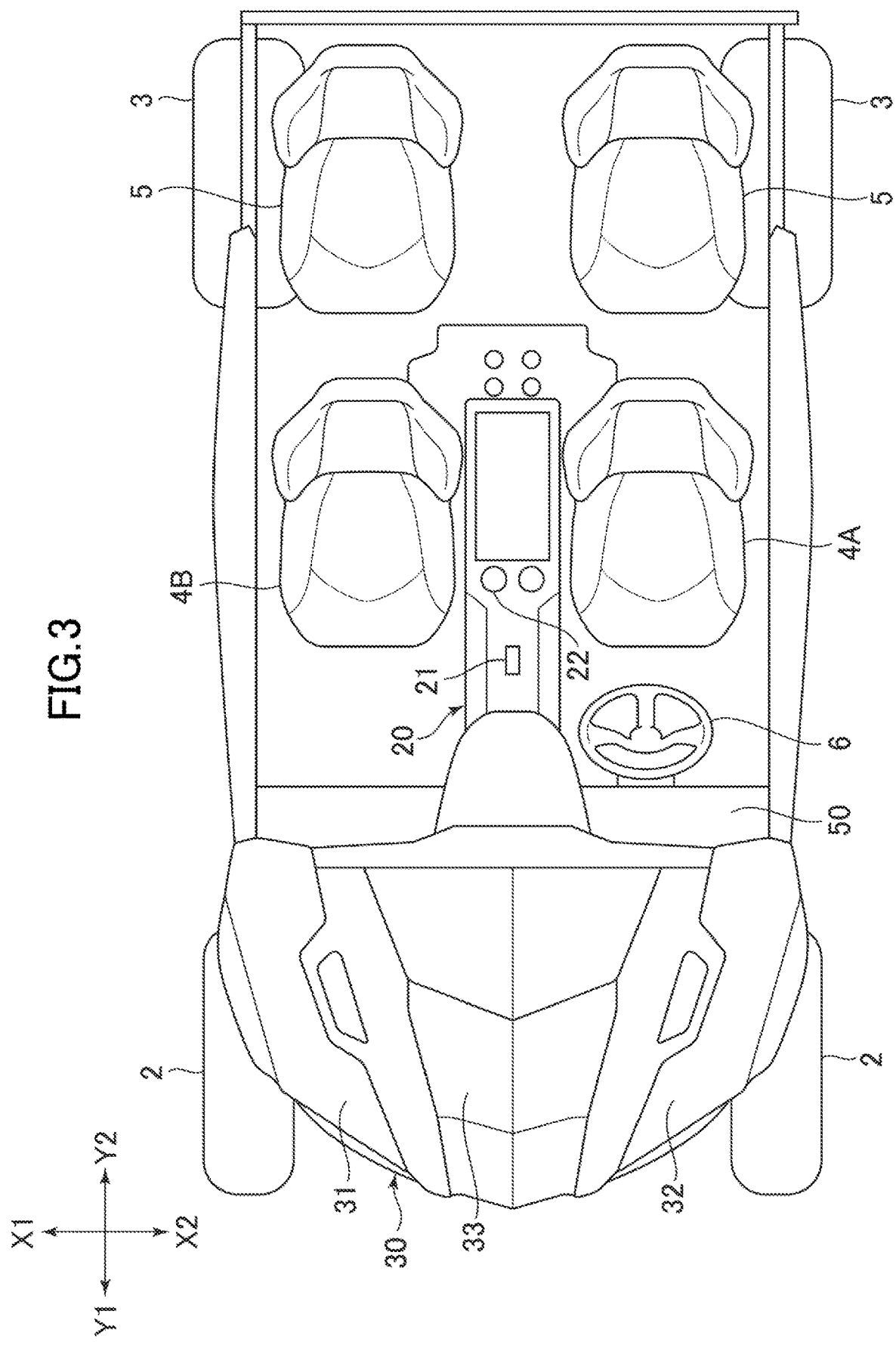
FIG. 3 is a top view of the vehicle as seen from above.
Figure 4:
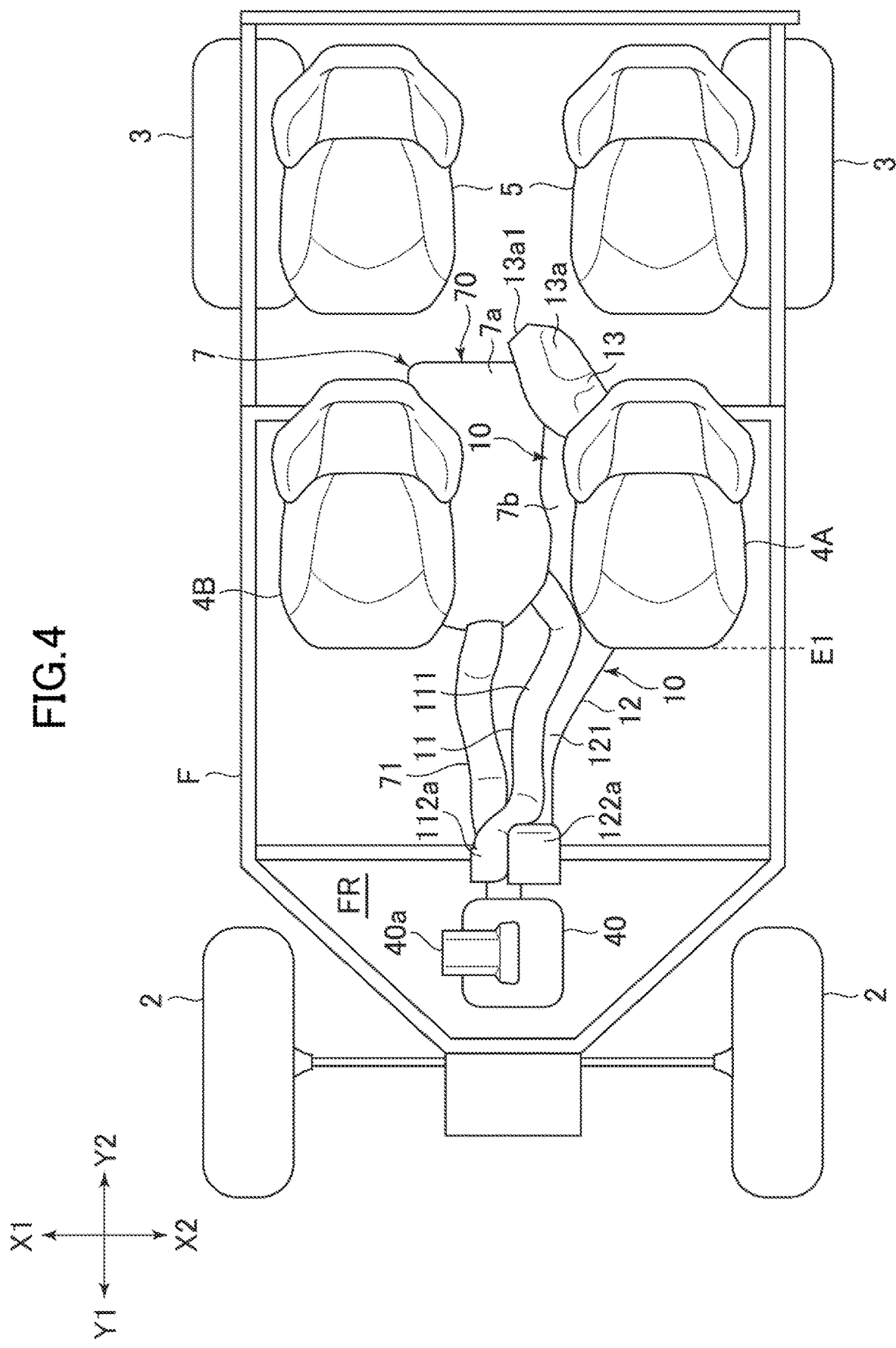
FIG. 4 is a top view of the vehicle as seen from above showing the engine unit (a part of the configuration of the vehicle is omitted).
Figure 5:
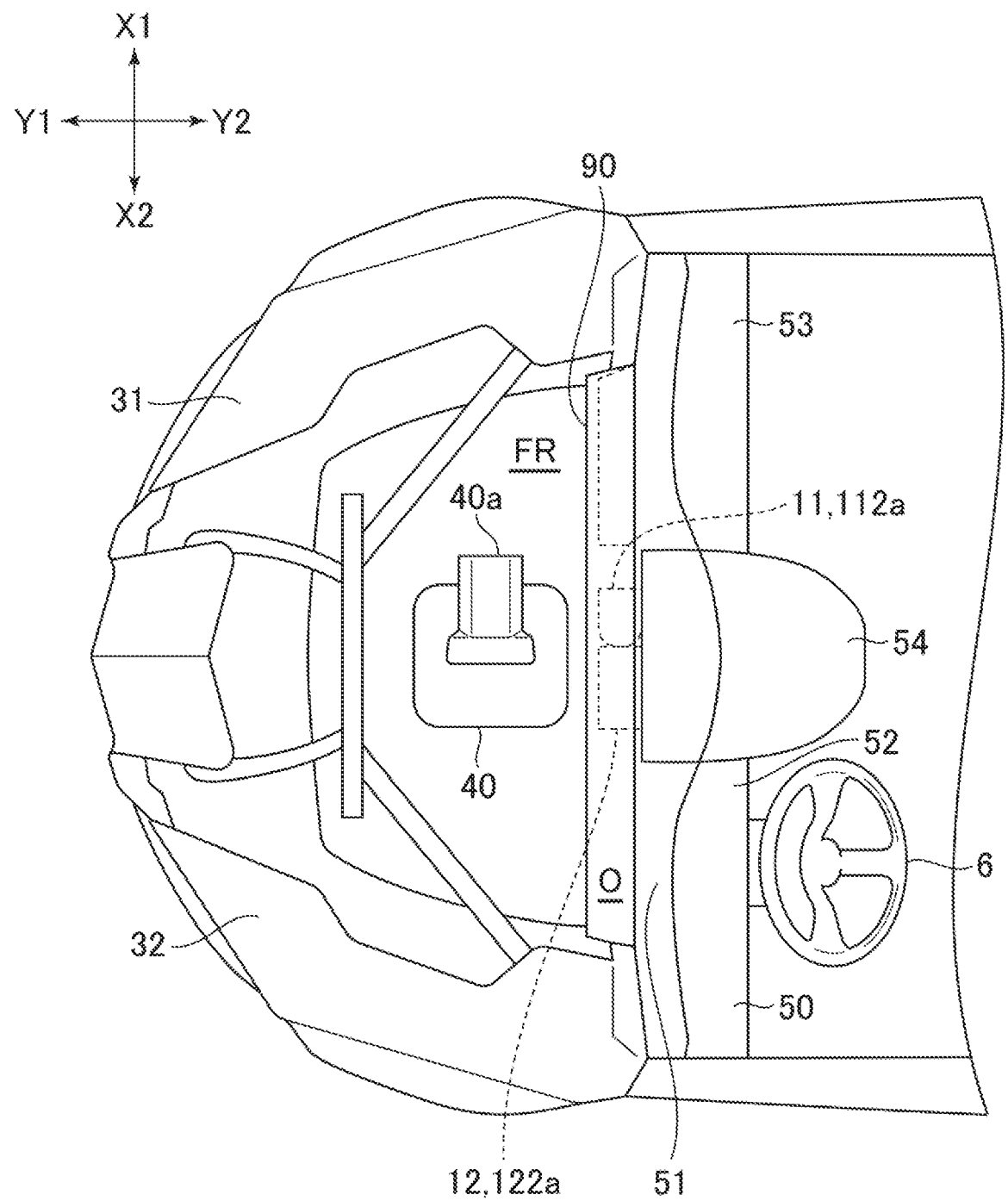
FIG. 5 is a top view showing a front region and the area around the front region.
Figure 6:
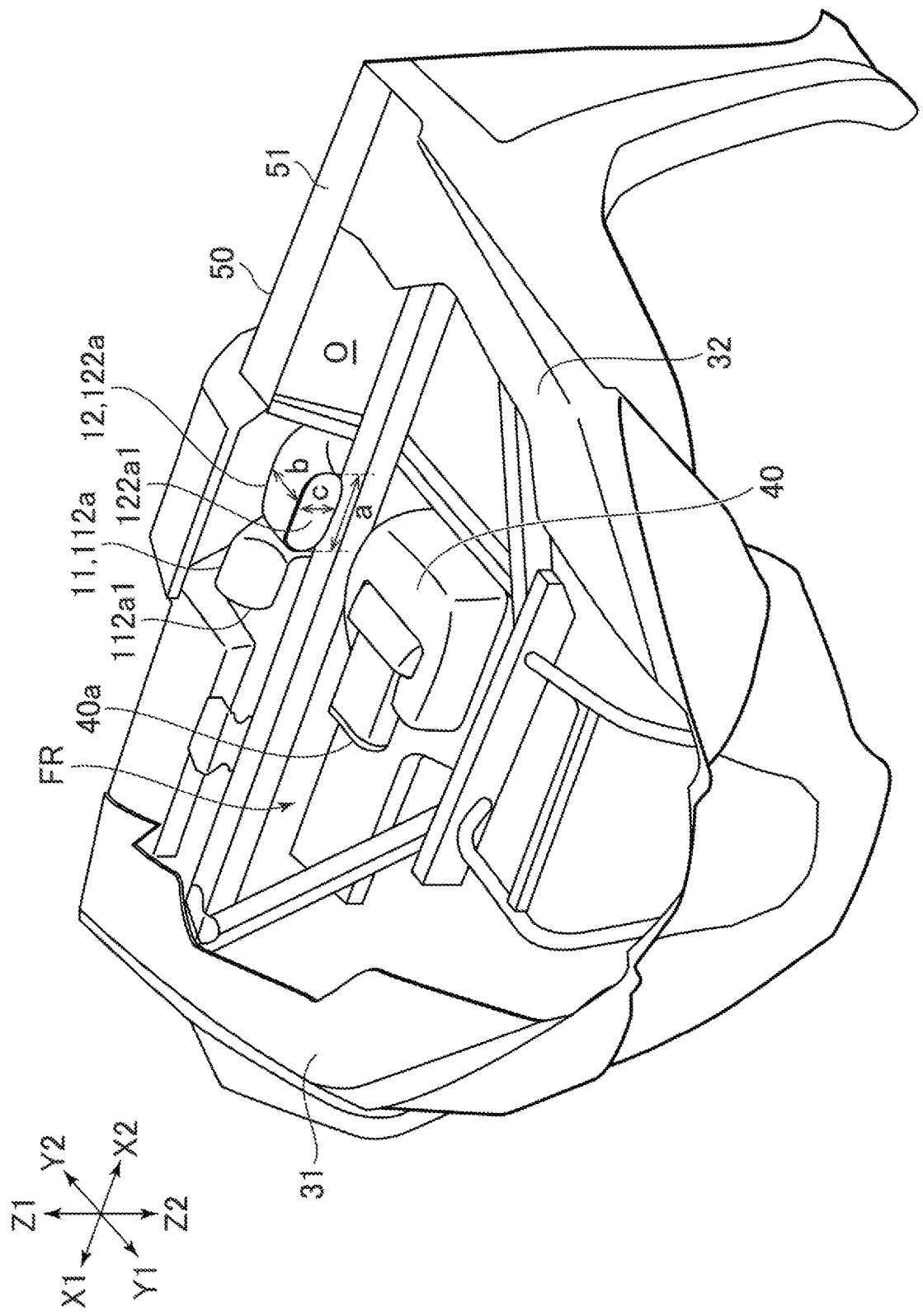
FIG. 6 is a perspective view showing the front region and the area around the front region.

FIG. 1 is a side view of the vehicle from the left. FIG. 2 is a side view of the vehicle from the left showing an engine unit (a part of the configuration of the vehicle is omitted). FIG. 3 is a top view of the vehicle as seen from above. FIG. 4 is a top view of the vehicle as seen from above showing the engine unit (a part of the configuration of the vehicle is omitted). FIG. 5 is a top view showing a front region and around the region. FIG. 6 is a perspective view showing the front region and around the region. Note that, in FIGS. 5 and 6, illustration of an opening/closing cover member 33, which will be described later, is omitted.

Figure 7:
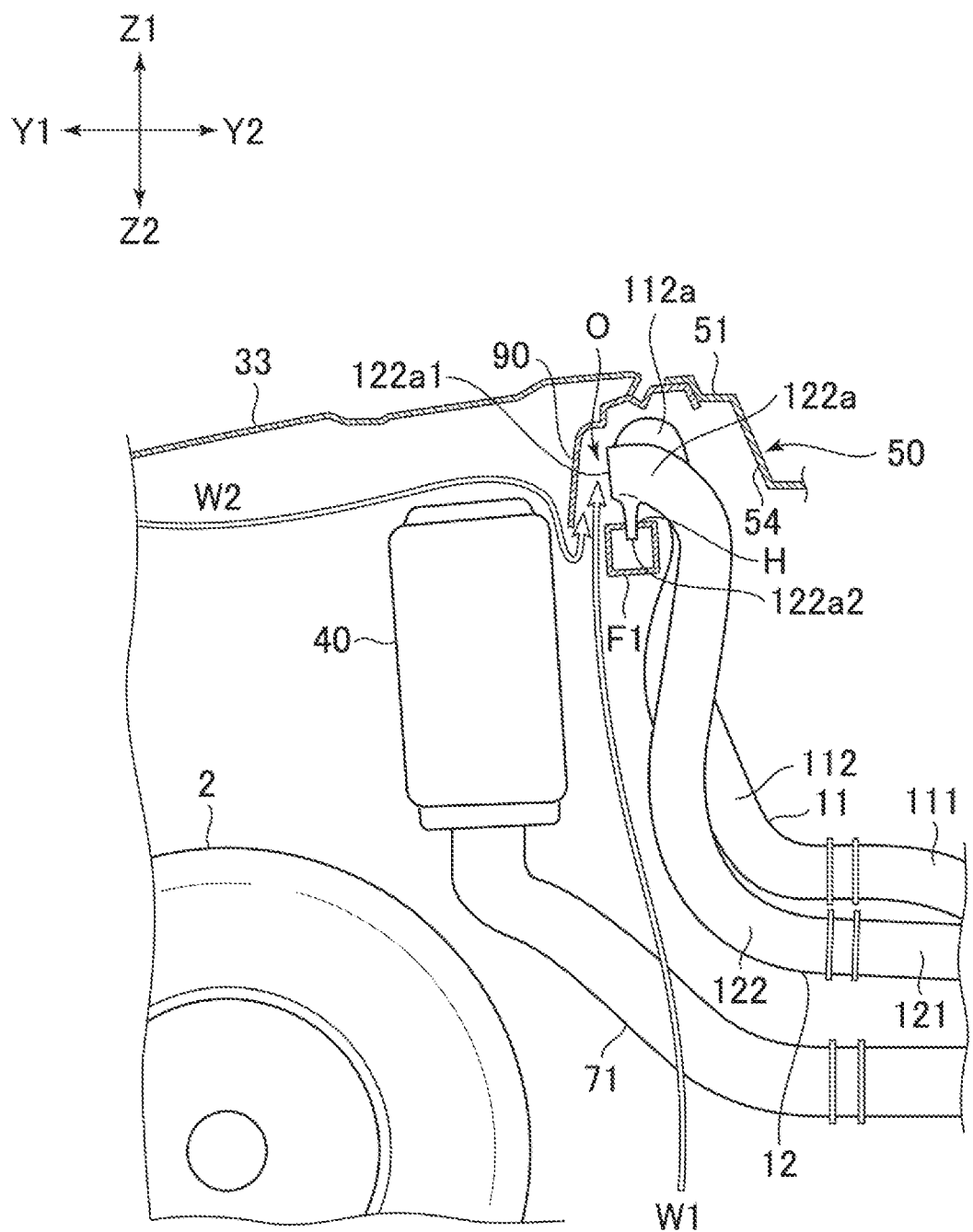
FIG. 7 is a sectional or side view showing a configuration of the front region and the area around the front region.
Figure 8:
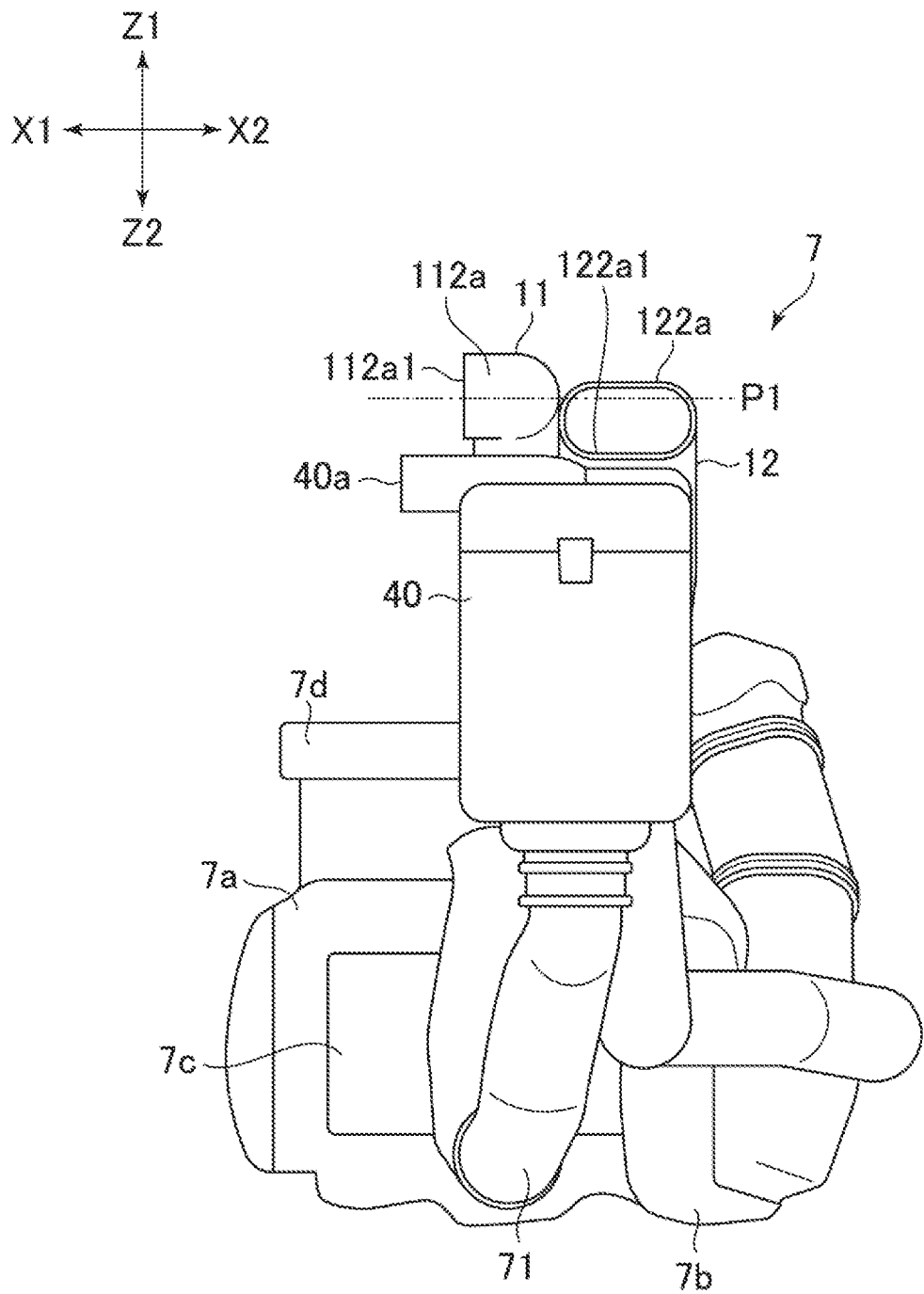
FIG. 8 is a front view of the engine unit as seen from the front side.
Figure 9:
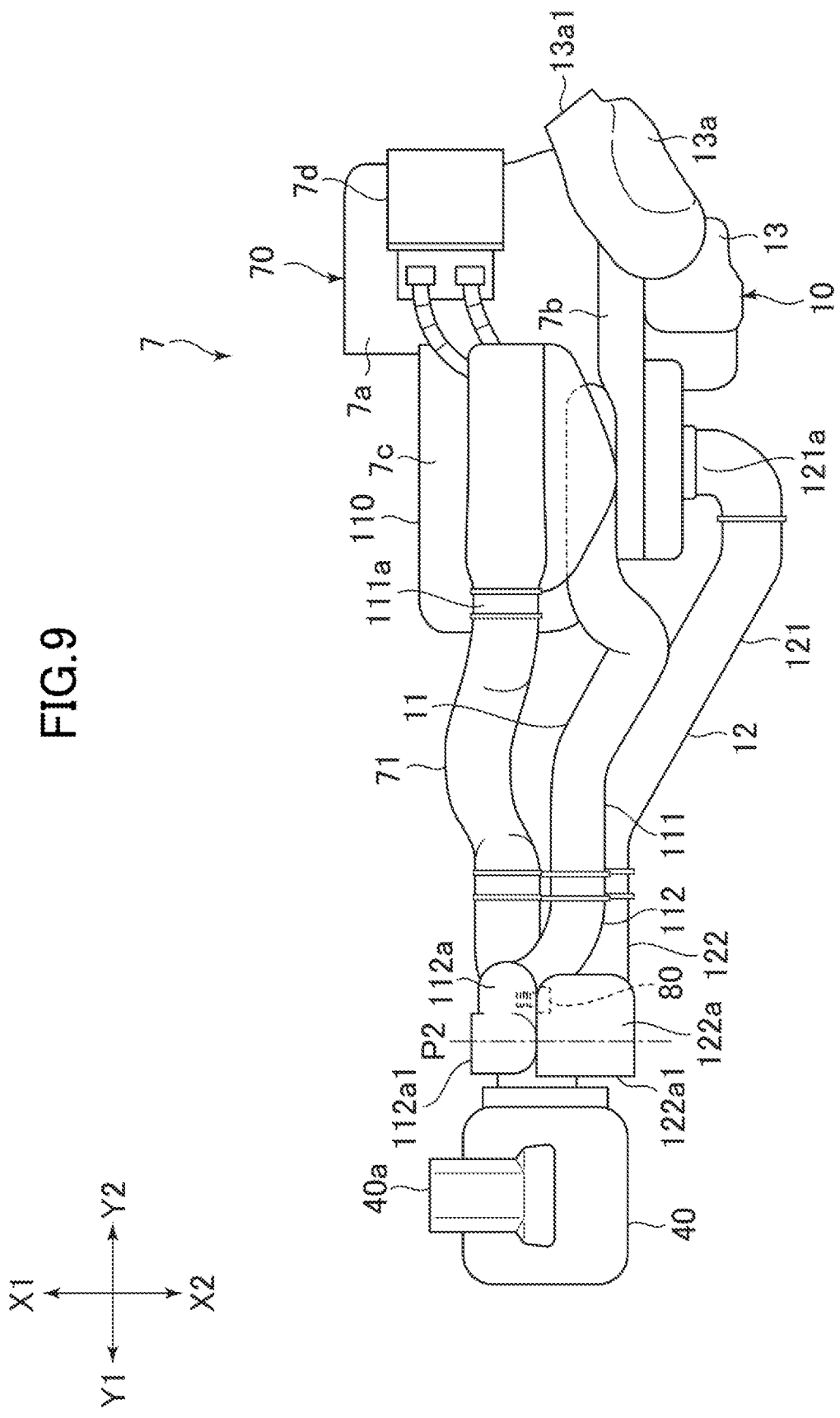
FIG. 9 is a top view of the engine unit as seen from above.
Figure 10:
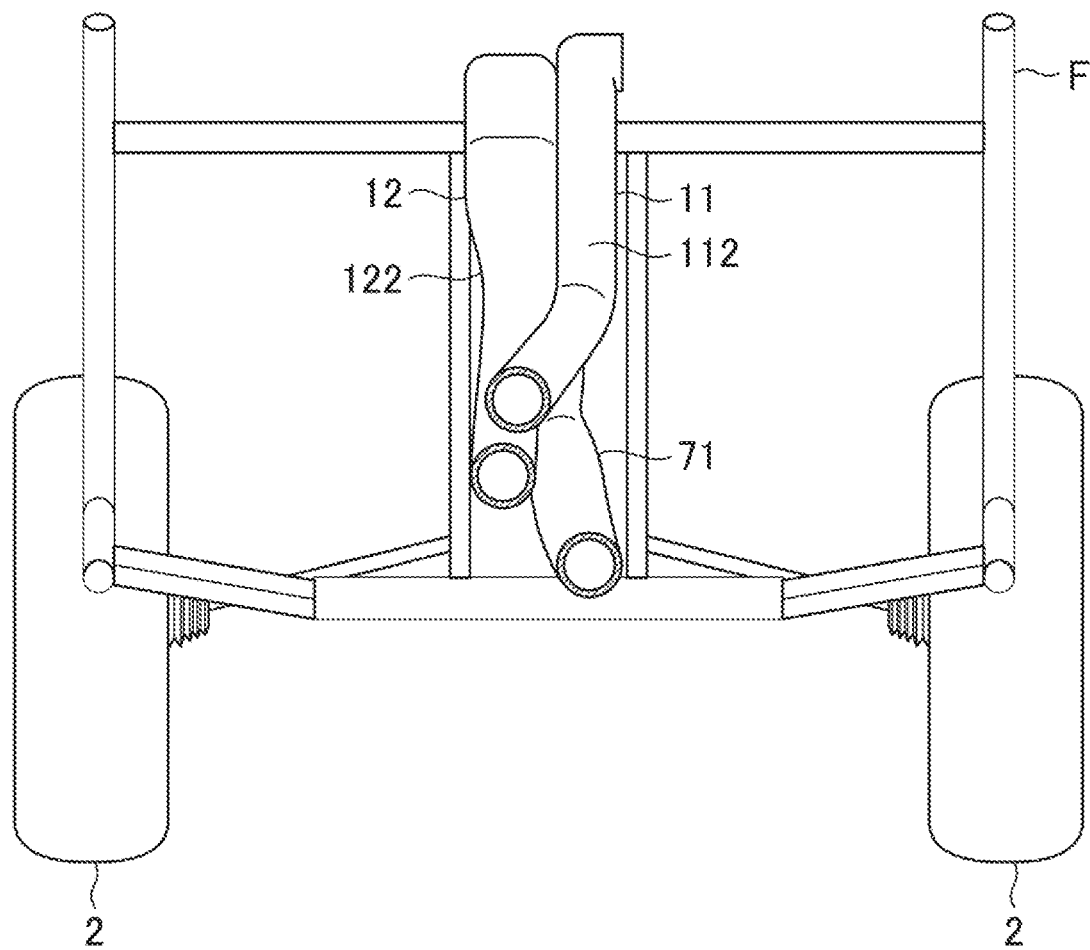
FIG. 10 is a rear view showing intake ducts.
Figure 11:
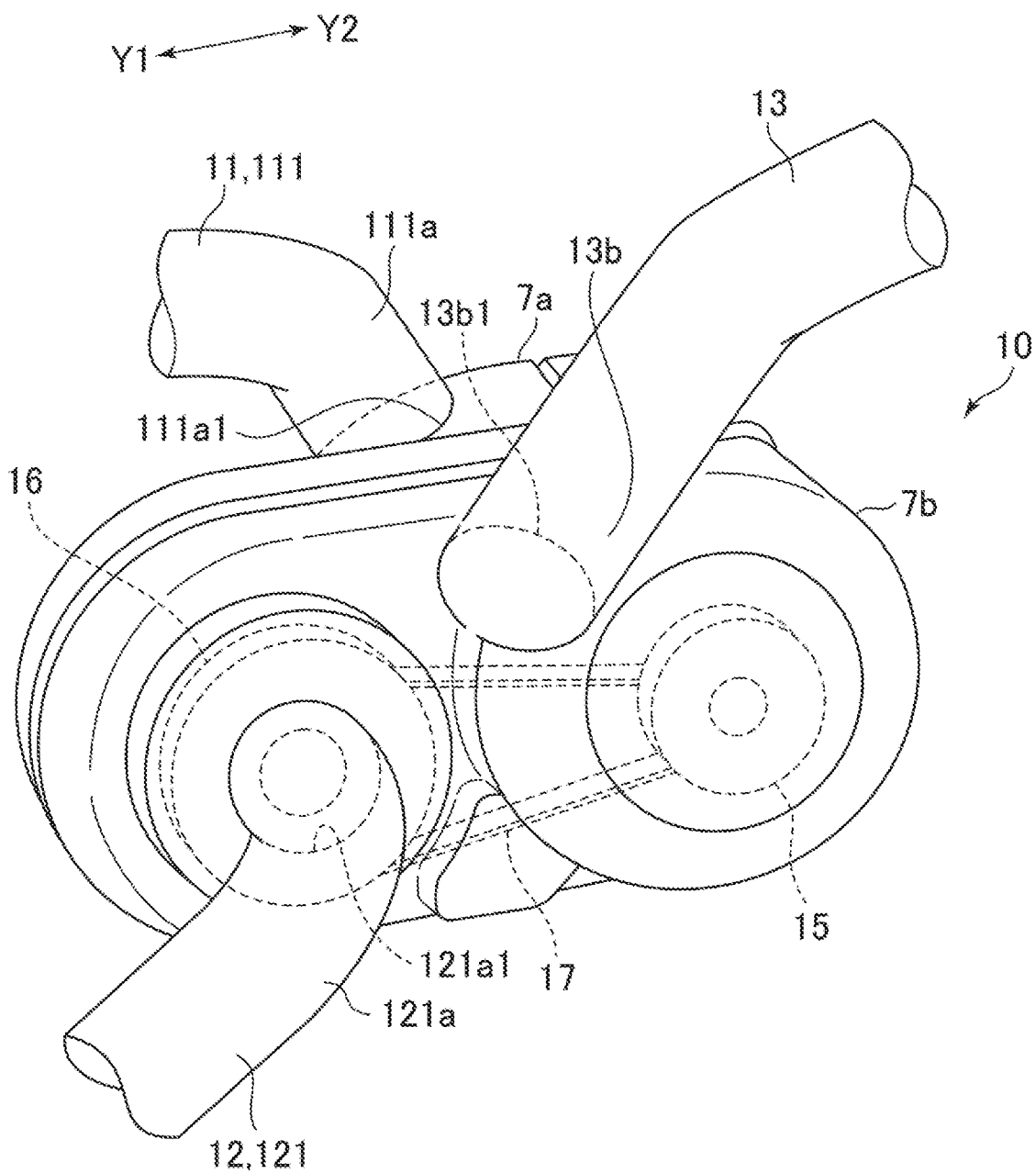
FIG. 11 is a perspective view showing a continuously variable transmission.

FIG. 7 is a sectional or side view showing a configuration of the front region and around the region. Note that, in FIG. 7, hatched parts show the section and the other parts show the side surface. FIG. 8 is a front view of the engine unit as seen from the front. FIG. 9 is a top view of the engine unit as seen from above. FIG. 10 is a rear view showing intake ducts. FIG. 11 is a perspective view showing a continuously variable transmission.

[Overall Configuration of Vehicle]

First, referring to FIGS. 1 and 3, the summary of the overall configuration of the vehicle 1 of the embodiment is explained. The vehicle 1 is a vehicle that is frequently used on uneven ground called "all terrain vehicle (ATV)", "Side-by-Side vehicle", "Utility vehicle", or "Recreational Off-Highway vehicle".

The vehicle 1 has front wheels 2 and rear wheels 3. As shown in FIG. 3, the front wheels 2 are respectively placed on the left and the right of the vehicle 1, and the rear wheels 3 are respectively placed on the left and the right of the vehicle 1. Further, the vehicle 1 has front seats 4 and rear seats 5 placed on the rear sides of the front seats 4. As shown in FIG. 3, the front seats 4 are respectively provided on the left side and the right side of the vehicle 1. The front seat 4 provided on the left side is a driver seat 4A on which a driver sits. The front seat 4 provided on the right side is a passenger seat 4B.

A steering wheel 6, an accelerator pedal (not shown), etc. are placed on the front side of the driver seat 4A. Further, as shown in FIG. 3, a select lever (operation lever) 21 and a center console 20 in which cup holders 22 etc. are provided are placed between the driver seat 4A and the passenger seat 4B.

Note that the vehicle 1 does not necessarily have the two front seats 4. That is, the vehicle does not necessarily have the passenger seat 4B placed next to the driver seat 4A. Further, the vehicle 1 does not necessarily have the rear seats 5. That is, the region in which the rear seats 5 are placed shown in FIG. 1 etc. may be used for luggage, etc.

The vehicle 1 has a vehicle body frame F. The vehicle body frame F is formed by connection of a plurality of pipes etc. On the vehicle body frame F, suspensions supporting the front seats 4, the rear seats 5, and the front wheels 2, suspensions supporting the rear wheels 3, and an engine unit 7 and a front cover 30, which will be described later, are mounted.

As shown in FIG. 3, a dashboard 50 is placed on the front side of the front seats 4. On the dashboard 50, various instruments including e.g. a speedometer and a tachometer are mounted. Further, on the dashboard 50, a glove box etc. located on the front side of the passenger seat 4B are provided. In addition, a navigation system etc. maybe mounted on the dashboard 50.

As shown in FIG. 3, the vehicle 1 has the front cover 30 forming a part of an exterior of the vehicle on the front side of the dashboard 50. The front cover 30 is located above the front wheels 2 in the side view. Note that, in the embodiment, a region below the front cover 30 and covered by the front cover 30 is referred to as "front region FR". In the front region FR, an air cleaner 40, which will be described later, etc. are placed. The front region FR and a region in which the passenger boards are partitioned by the dashboard 50.

As shown in FIG. 3, the front cover 30 includes a plurality of cover members. Specifically, the front cover 30 includes a right cover member 31 forming a part on the right side, a left cover member 32 forming a part on the left side, and the opening/closing cover member 33 forming a part between the right cover member 31 and the left cover member 32. The opening/closing cover member 33 is also called the "hood". The right cover member 31 and the left cover member 32 are fixed to the vehicle body frame F of the vehicle 1. The opening/closing cover member 33 is provided to enable opening and closing of the front region FR. A user may clean and replace the air cleaner 40 etc. in the open state of the opening/closing cover member 33. Note that FIGS. 5 and 6 show the exposed front region FR by omission of the illustration of the opening/closing cover member 33.

[Configuration and Placement of Engine Unit]

Next, details of the configuration and the placement of the engine unit 7 will be explained. The vehicle 1 employs the so-called mid-engined layout in which an engine 70 and a continuously variable transmission 10 are placed near the center of the vehicle in the front-back direction.

As shown in FIG. 9, the engine unit 7 has the engine 70, the continuously variable transmission 10 that varies and outputs rotary power from the engine 70, and a transmission 110 that varies the rotary power output from the continuously variable transmission 10 (hereinafter, the continuously variable transmission is referred to as "CVT"). As shown in FIG. 11, the CVT 10 has a primary pulley 15, a secondary pulley 16, and a V-belt looped over the pulleys. Further, the primary pulley 15 preferably has a fin (not shown) projecting from the side surface. The primary pulley 15 having the fin rotates, and thereby, outside air is introduced into the CVT 10 via an intake duct 11, which will be described later. The secondary pulley 16 also preferably has a fin.

The transmission 110 has a gear (dog clutch) connected to the select lever 21 and movable by the operation of the select lever 21, and can select driving modes of LOW (forward), HIGH (forward), reverse, etc. by the operation of the select lever 21. The rotary power output by the transmission 110 is transmitted to the rear wheels 3 and the front wheels 2 via a propeller shaft (not shown) extending in the front-back direction. The engine 70 has a crankcase 7a placed in the lower part thereof, and a cylinder unit 7d placed on the top side of the crankcase 7a. A transmission case 7c housing the transmission 110 is placed on the front side of the crank case 7a. A CVT case 7b housing the CVT 10 is placed on the left side of the crank case 7a and the transmission case 7c. Further, the engine unit 7 has intake ducts 11 and 12 and an exhaust duct 13 for cooling the V-belt 17 of the CVT 10. These ducts 11, 12, 13 will be described later in detail.

As shown in FIGS. 2 and 4, the engine 70 and the CVT 10 are at least partially located on the back side of the front-end (E1 in FIG. 2) of the front seats 4 and on the bottom side of the lower end (E2 in FIG. 2) of the front seats 4. In this example, the crank case 7a, the CVT case 7b, and the transmission case 7c are located on the bottom side of the lower end (E2 in FIG. 2) of the front seats 4. Note that the cylinder unit 7d (cylinder and cylinder head) may be partially above a lower end of a seat bottom 41. Further, in this example, the crank case 7a, the CVT case 7b, and the transmission case 7c are located on the rear side of the front-end (E1 in FIG. 2) of the seat bottom 41.

Note that the front seat 4 includes the seat bottom 41 containing a seat surface on which the passenger sits and a seat back 42 placed on the rear side of the seat bottom and supporting the back of the passenger sitting on the seat bottom 41. Here, the front-end of the front seat 4 is the front-end of the seat bottom 41, and the lower end of the front seat 4 is the lower end of the seat bottom 41. The broken lines E1 shown in FIGS. 2 and 4 show the front-end of the front seat 4, and the broken line E2 shown in FIG. 2 shows the lower end of the front seat 4.

Further, as shown in FIG. 4, the engine unit 7 is at least partially located between the driver seat 4A and the passenger seat 4B in the top view. In the embodiment, the crank case 7a, the CVT case 7b, and the transmission case 7c are partially located between the driver seat 4A and the passenger seat 4B in the top view of the vehicle body.

Further, apart of the engine unit 7 is provided immediately below the center console 20. In the embodiment, as shown in FIGS. 3 and 4, parts of the crank case 7a of the engine 70 and the CVT case 7b of the CVT 10 are provided immediately below the center console 20. Note that, in FIG. 4, illustration of the center console 20 is omitted and the engine unit 7 is seen, however, actually, as shown in FIG. 3, the engine unit 7 is not seen from the passenger's perspective due to the center console 20.

As shown in FIG. 9, an intake duct 71 is connected to the cylinder unit 7d of the engine 70. The front-end portion of the intake duct 71 is connected to the air cleaner 40 and the rear-end portion thereof is connected to the cylinder unit 7d of the engine 70 via a chamber 72.

The air cleaner 40 has a box shape and has an intake port 40a for taking in the outside air in the upper part thereof. The air cleaner 40 has a filter that cleans the outside air inside. The air cleaner 40 sends the outside air taken in from the intake port 40a through the intake duct 71 to the engine 70. The intake port 40a opens toward the right side. That is, the intake port 40a opens in a direction orthogonal to the direction in which the vehicle 1 travels. Accordingly, during traveling of the vehicle 1, the possibility of taking in dust etc. from the intake port 40a may be reduced.

The air cleaner 40 is placed in the front region FR. As shown in FIGS. 2 and 4, the intake duct 71 is at least partially placed on the bottom side of the lower end (E2 in FIG. 2) of the front seats 4, and extends from the rear side toward the front side. Further, as shown in FIGS. 3 and 4, a part of the intake duct 71 is provided to extend immediately below the center console 20.

As shown in FIGS. 7 and 9, the intake duct 11 includes a first tube part 111 extending in the front-back direction and a second tube part 112 connected to the front portion of the first tube part 111 and extending in the vertical direction. Apart of the first tube part 111 of the intake duct 11 is provided to extend immediately below the center console 20. Note that the first tube part 111 and the second tube part 112 may be separately formed or integrally formed. That is, the two tube parts 111 and 112 may be connected to each other by connecting means, or a part of one tube may function as the tube part 111 and the other part may function as the tube part 112.

As shown in FIG. 11, a connection port 111a1 connected to the crank case 7a is provided in a rear-end portion 111a of the first tube part 111. The interior of the intake duct 11 communicates with the interior of the CVT case 7b via the connection port 111a1 and the crank case 7a. As shown in FIG. 6, an intake port 112a1 for taking in the outside air is provided in a front-end portion 112a of the second tube part 112. The intake duct 11 sends the outside air taken in from the intake port 112a1 through the second tube part 112, the first tube part 111, the connection port 111a1, and the crank case 7a to the CVT 10.

As shown in FIGS. 7 and 9, an intake duct 12 includes a first tube part 121 extending in the front-back direction and a second tube part 122 connected to the front portion of the first tube part 121 and extending in the vertical direction. A part of the first tube part 121 of the intake duct 12 is provided to extend immediately below the center console 20. Note that the first tube part 121 and the second tube part 122 may be separately formed or integrally formed. That is, the two tube parts 121 and 122 may be connected to each other by connecting means, or a part of one tube may function as the tube part 121 and the other part may function as the tube part 122.

As shown in FIG. 11, a connection port 121a1 connected to the CVT case 7b is provided in a rear-end portion 121a of the first tube part 121. The connection port 121a1 is open to face the secondary pulley 16 on the front side and the left side of the CVT case 7b. As shown in FIG. 9 etc., an intake port 122a1 for taking in the outside air is provided in a front-end portion 122a of the second tube part 122. The intake duct 12 sends the outside air taken in from the intake port 122a1 through the second tube part 122, the first tube part 121, and the connection port 121a1 to the CVT 10.

The front-end portion 122a of the intake duct 12 has predetermined widths in the front-back direction, the left-right direction, and the vertical direction. Specifically, as shown in FIG. 6, the front-end portion 122a of the intake duct 12 has a width a in the left-right direction, a width b in the front-back direction, and a width c in the height direction. Note that the front-end portion 112a of the intake duct 11 also has predetermined widths in the front-back direction, the left-right direction, and the vertical direction.

The two intake ducts 11 and 12 may be placed to overlap in at least one of the rear view and the top view. For example, as shown in FIG. 10, the intake duct 12 is preferably provided so that the second tube part 122 may at least partially overlap with the second tube part 112 of the intake duct 11 in the rear view. Specifically, as shown in FIG. 10, the second tube part 112 and the second tube part 122 are placed so that the lower portions thereof may overlap and the second tube part 112 bends toward the right so that the overlapping portions may decrease toward the upper portions in the rear view. According to the configuration, the front parts of the intake ducts 11 and 12 (i.e., the second tube parts 112 and 122) may be easily placed in a space having a smaller width in the left-right direction. Further, the intake port 112a1 and the intake port 122a1 may be placed in locations close to each other.

As shown in FIG. 9, the intake duct 12 is preferably placed so that the first tube part 121 may at least partially overlap with the first tube part 111 of the intake duct 11 in the top view. Specifically, as shown in FIG. 9, the first tube part 111 and the first tube part 121 bend not to overlap each other in the rear parts so that the overlapping portions may increase toward the front parts. According to the configuration, the rear parts of the intake ducts 11 and 12 (i.e., the first tube parts 111 and 121) may be easily placed in a space having a smaller width in the left-right direction formed immediately below the center console 20.

Here, the reason that the two intake ducts connected to the CVT case 7b are provided is explained. In the embodiment, as described above, the configuration in which the intake duct 11 and the intake duct 12 are respectively connected to the CVT case 7b is employed. As described above, the two intake ducts are provided, and thereby, the CVT 10 may be cooled more effectively. Particularly, when the rubber V-belt 17 is used, improvement of cooling performance is important.

Further, in the embodiment, the configuration in which the outside air is taken in from the two intake ports 112a1 and 122a1 and the outside air taken in from those two intake ports 112a1 and 122a1 is sent to the CVT 10 via the respective different connection ports. Here, a configuration in which the outside air is taken in from one intake port and the outside air is split and is sent to the CVT via the different connection ports, is possible. However, in the configuration, when the state changes from a state (low-velocity state) in which the outside air is introduced into the CVT 10 by rotation of the primary pulley 15 to a state (high-velocity state) in which the outside air is introduced into the CVT 10 by rotation of the secondary pulley 16, that is, when the speed of the vehicle 1 increases, the air may circulate within the ducts and the warm air may accumulate within the intake ducts.

In the configuration of the embodiment, the intake port 112a1 of the intake duct 11 and the intake port 122a1 of the intake duct 12 are independently provided, and the connection port 111a1 of the intake duct 11 and the connection port 121a1 of the intake duct 12 are independently provided. That is, the independent two flow channels are provided. Accordingly, circulation and accumulation of the warm air within the intake ducts is suppressed. As a result, the cooling performance of the CVT 10 is improved.

Further, in the embodiment, the two intake ducts are used and the same measures for water exposure are taken for those intake ducts. That is, the intake port 112a1 of the intake duct 11 and the intake port 122a1 of the intake duct 12 are placed to be adjacent to each other, and thereby, it is not necessary to take different measures for water exposure for those respective two intake ducts.

Specifically, the intake port 112a1 of the intake duct 11 and the intake port 122a1 of the intake duct 12 are placed in the front region FR. More specifically, the intake port 112a1 of the intake duct 11 and the intake port 122a1 of the intake duct 12 are located at the front side of the front-end (El in FIG. 2) of the front seats 4 and on the top side of the lower end (E2 in FIG. 2) of the front seats 4. Further, as shown in FIG. 8, the front-end portion 112a of the intake duct 11 and the front-end portion 122a of the intake duct 12 are provided at heights at which the intake port 112a1 and the intake port 122a1 at least partially overlap with each other in the vertical direction. That is, the intake port 112a1 and the intake port 122a1 are provided at the heights at which the ports cross with respect to a common horizontal plane P1 (see FIG. 8). Further, as shown in FIGS. 2 and 9, the front-end portion 112a of the intake duct 11 and the front-end portion 122a of the intake duct 12 are placed in locations in which at least parts of the portions overlap in the front-back direction. That is, the front-end portion 112a of the intake duct 11 and the front-end portion 122a of the intake duct 12 are placed to cross a common plane P2 (see FIG. 9) along the left-right direction. Furthermore, as shown in FIG. 8, the upper ends of the intake port 112a1 of the intake duct 11 and the intake port 122a1 of the intake duct 12 are placed on the top side of the upper end of the intake port 40a of the air cleaner 40.

As described above, the intake ports 112a1 and 122a1 are located on the top side of the lower end of the front seats 4, and thereby, even when the vehicle travels on uneven ground through a puddle etc., it is difficult for water to enter the intake ports 112a1 and 122a1. Further, the intake ports 112a1 and 122a1 are located on the front side of the front-end of the front seats 4, and thereby, the clean outside air at the lower temperature may be taken in and sent to the CVT 10. Accordingly, the CVT 10 may be cooled more effectively.

Further, as shown in FIG. 2, the intake ports 112a1 and 122a1 are located on the top side of the upper end of the front wheels 2 (upper end of the tires) in the side view. Accordingly, it is difficult for the dust stirred up by driving of the front wheels 2 or the like to enter the intake ports 112a1 and 122a1.

Furthermore, the intake ports 112a1 and 122a1 are placed in the front region FR and covered by the front cover 30, and thereby, it is difficult for dust and rainwater to enter.

The front-end portion 112a and the front-end portion 122a are placed nearly at the center in the width direction (left-right direction) of the vehicle body. Specifically, as shown in FIG. 5, the front-end portion 112*a* and the front-end portion 122*a* are placed on the front side of a center part 54 placed between a left part 52 of the dashboard 50 in which meters and gauges etc. are provided and a right part 53 of the dashboard 50 in which the glove box etc. are provided. The layout is restricted on the front side of the left part 52 and the right part 53, however, the front-end portions maybe placed without restrictions of layout on the front side of the center part 54. A part of the CVT 10 to which the intake duct 11 and the intake duct 12 are connected is placed immediately below the center console 20 placed nearly at the center in the width direction of the vehicle body. Accordingly, the front-end portion 112*a* and the front-end portion 122*a* may be placed in the front region FR without an unnecessary increase in the lengths of the intake duct 11 and the intake duct 12.

As shown in FIGS. 5 and 7, the vehicle 1 has an inner cover 90 attached to a front part 51 of the dashboard 50. Note that, here, of the dashboard 50, apart on the front side in the traveling direction of the vehicle 1 is referred to as the "front part 51". The front inner cover 90 forms an open space O opening in the lower part with the front part 51 of the dashboard 50. The front-end portion 112*a* of the intake duct 11 and the front-end portion 122*a* of the intake duct 12 are placed within the open space O. The front sides and the top side of the front-end portion 112*a* of the intake duct 11 and the front-end portion 122*a* of the intake duct 12 are covered by the inner cover 90. The inner cover 90 is provided as described above, and thereby, entry of dust and rainwater into the intake port 112*a*1 of the intake duct 11 and the intake port 122*a*1 of the intake duct 12 maybe further suppressed. Note that, in FIG. 6, the state in which the inner cover 90 is detached from the front part 51 is shown.

The lower part of the open space O is opened, and thereby, the outside air enters the open space O from the lower part of the open space O even in the state in which the inner cover 90 is attached to the front part 51. An arrow W1 in FIG. 7 shows a flow channel of the outside air. The intake port 112*a*1 of the front-end portion 112*a* of the intake duct 11 and the intake port 122*a*1 of the front-end portion 122*a* of the intake duct 12 take in the outside air entering from the lower part of the open space O. Note that a plurality of vent holes are formed in the front cover 30, and the outside air entering from the front side also enters the open space O as shown by an arrow W2 in FIG. 7.

The front part 51 of the dashboard 50 is not limited to one integrated with a part on the rear side (front seat 4 side) of the dashboard 50. That is, the front part 51 may be formed separately from the part to which various meters and gauges are attached to the dashboard. In the embodiment, a member that partitions the front region FR and a region in which the passengers board, is defined as the dashboard 50.

Further, as shown in FIG. 7, the intake port 112*a*1 of the intake duct 11 and intake port 122*a*1 of the intake duct 12 and the intake port 40*a* of the air cleaner 40 are partitioned by the inner cover 90. The inner cover 90 extends to the bottom side of the lower ends of the intake port 112*a*1 of the intake duct 11 and the intake port 122*a*1 of the intake duct 12. That is, the air cleaner 40 is placed outside of the open space O. According to the configuration, the inner cover 90 maybe placed near the intake port 112*a*1 of the intake duct 11 and the intake port 122*a*1 of the intake duct 12, and dust resistance of the intake port 112*a*1 of the intake duct 11 and the intake port 122*a*1 of the intake duct 12 can be improved.

The direction in which the intake port 112*a*1 of the intake duct 11 opens and the direction in which the intake port 122*a*1 of the intake duct 12 opens are different. In the embodiment, the intake port 112*a*1 of the intake duct 11 opens toward the right side and the intake port 122*a*1 of the intake duct 12 opens toward the front side. Note that the directions in which the intake ports of the intake ducts open are not limited to those, but, for example, one intake port may face the right side and the other intake port may face the left side. Or, for example, one intake port may face the bottom side and the other intake port may face the left side.

In the example shown in FIG. 7, the front-end portion 122*a* of the intake duct 12 has a supported portion 122*a*2 extending downward. The vehicle body frame F has a support hole H opening upward. More specifically, the vehicle body frame F has a cross part F1 extending in the left-right direction and the support hole H is formed in the cross part F1. The supported portion 122*a*2 is inserted through the support hole H. Thereby, the front-end portion 122*a* of the intake duct 12 is supported by the vehicle body frame F. Note that the support structure of the front-end portion 122*a* of the intake duct 12 is not limited to that shown in FIG. 7. Further, the front-end portion 112*a* of the intake duct 11 may be supported by the vehicle body frame F.

It is preferable that the front-end portion 112*a* of the intake duct 11 and the front-end portion 122*a* of the intake duct 12 are connected to each other. FIG. 9 shows an example in which a connection hole is formed in the left side surface of the front-end portion 112*a* of the intake duct 11, a connection hole is formed in the right side surface of the front-end portion 122*a* of the intake duct 12, a bolt 80 inserted through those connection holes, and thereby, the front-end portion 112*a* and the front-end portion 122*a* are connected. As described above, the front-end portion 112*a* of the intake duct 11 and the front-end portion 122*a* of the intake duct 12 have the connection holes at the sides different from the open sides of the intake ports. Note that the connecting structure between the front-end portion 112*a* of the intake duct 11 and the front-end portion 122*a* of the intake duct 12 is not limited to that, but another connecting structure in which one front-end portion is fixed relative to the other front-end portion may be used. Or, the connecting structure is not limited to the connection between the front-end portion 112*a* and the front-end portion 122*a*, but a connecting structure connecting at least parts of the intake duct 11 and the intake duct 12 may be employed. For example, the second tube part 112 of the intake duct 11 and the second tube part 122 of the intake duct 12 may be connected by a connecting structure.

The engine unit 7 has the exhaust duct 13. As shown in FIGS. 9 and 11, the exhaust duct 13 has a connection port 13*b*1 connected to the CVT case 7*b* in a front-end portion 13*b* and has an exhaust port 13*a*1 in a rear-end portion 13*a*. The exhaust duct 13 exhausts the gas within the CVT case 7*b* to outside of the CVT 10.

Modified Example

Figure 12:
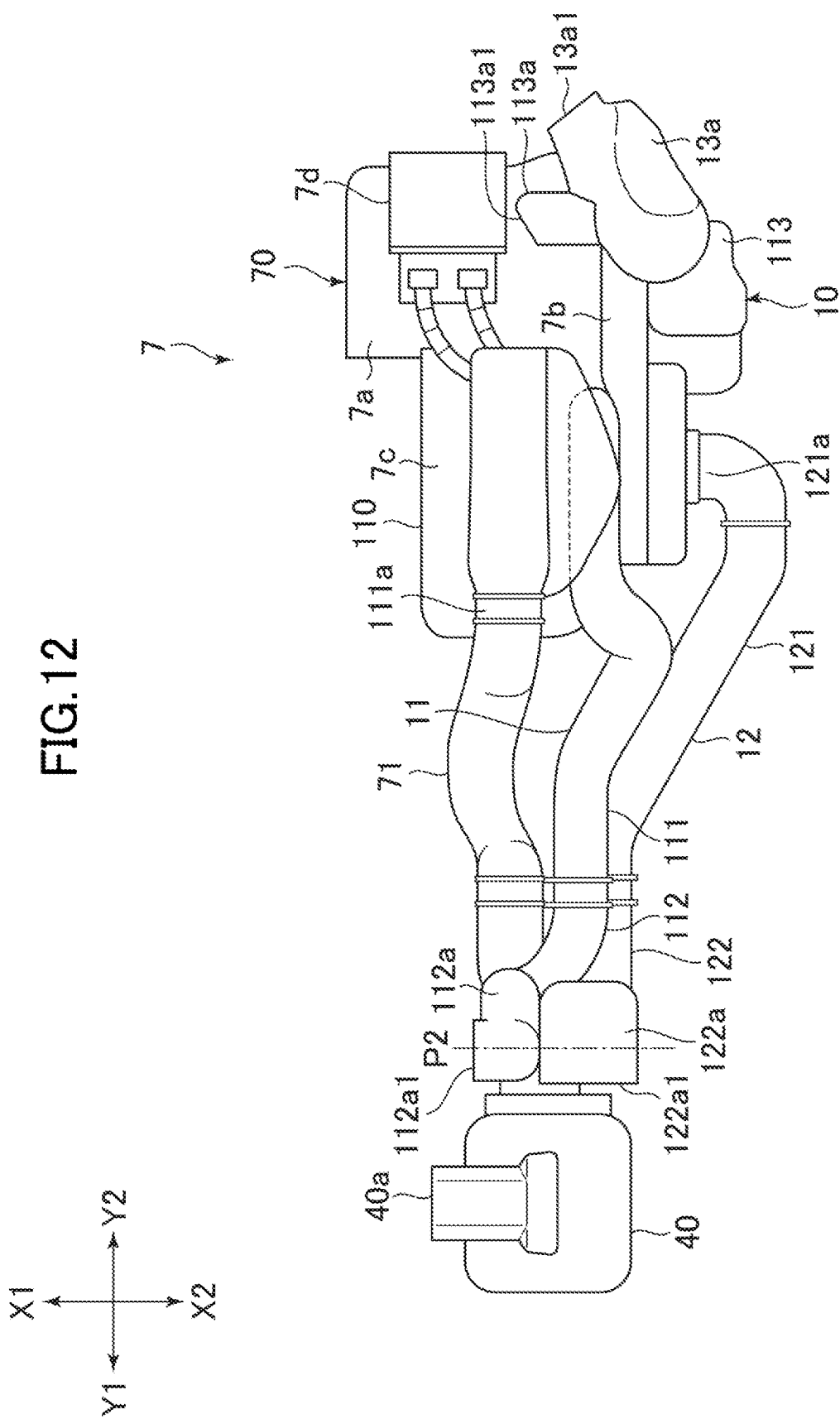
FIG. 12 is a top view of an engine unit of a modified example as seen from above.

Referring to FIG. 12, the engine unit 7 of a modified example of the embodiment will be explained. Note that the same signs are used for the same configurations as the configurations of the embodiment explained with reference to FIG. 9 etc., and the explanation thereof will be omitted.

The engine unit 7 of the modified example has an exhaust duct 113 connected to the CVT 10. The exhaust duct 113 has the exhaust port 13*a*1 and a branch portion 113*a* in the rear-end portion 13*a*. The branch portion 113*a* extends toward the engine 70 and has an exhaust port 113*a*1 in the end part thereof. In the example shown in FIG. 12, the engine 70 is placed on the right side of the CVT 10, and the exhaust port 113a1 of the branch portion 113a opens toward the right side. The exhaust duct 113 exhausts the gas of the CVT case 7b from both the exhaust port 13a1 and the exhaust port 113a1. In the configuration of the modified example, the engine 70 is cooled by the gas exhausted from the exhaust port 113a1. Particularly, it is preferable that the exhaust port 113a1 opens toward a side for cooling the firing device of the engine 70.

SUMMARY (1) As described above, the vehicle 1 proposed in this disclosure has the front seat 4 on which the driver sits, the engine 70 at least partially located on the rear side of the front-end E1 of the front seat 4 and the bottom side of the lower end E2 of the front seat 4, the CVT 10 at least partially located on the rear side of the front-end E1 of the front seat 4 and the bottom side of the lower end E2 of the front seat 4, and varying and outputting the rotary power from the engine 70, the intake duct 11 at least partially extending from the rear side toward the front side on the bottom side of the lower end E2 of the front seat 4, and having the intake port 112a1 in the front-end portion 112a and sending the outside air taken in from the intake port 112a1 to the CVT 10, the intake duct 12 at least partially extending from the rear side toward the front side on the bottom side of the lower end E2 of the front seat 4, and having the intake port 122a1 in the front-end portion 122a and sending the outside air taken in from the intake port 122a1 to the CVT 10, and one or more covers covering both the front-end portion 112a of the intake duct 11 and the front-end portion 122a of the intake duct 12, wherein the front-end portion 112a of the intake duct 11 and the front-end portion 122a of the intake duct 12 are located on the front side of the front-end E1 of the front seat 4 and the top side of the lower end E2 of the front seat 4.

(2) It is preferable that the intake port 112a1 and the intake port 122a1 are provided at the heights crossing the common horizontal plane P1.

(3) It is preferable that the front-end portion 112a of the intake duct 11 and the front-end portion 122a of the intake duct 12 are placed to cross the common plane P2 along the left-right direction.

(4) It is preferable that the direction in which the intake port 112a1 opens and the direction in which the intake port 122a1 opens are different.

(5) It is preferable that the exhaust duct 13 having the connection port 13b1 connected to the CVT case 7b in the front-end portion 13b, having the exhaust port 13a1 in the rear-end portion 13a, and exhausting the gas within the CVT case 7b to outside via the connection port 13b1 and the exhaust port 13a1 is provided.

(6) It is preferable that the air cleaner 40 having the intake port 40a for taking in the outside air and sending the outside air taken in from the intake port 40a to the engine 70 via the intake duct 71 is provided, and the air cleaner 40 is provided on the front side of the front-end portion 112a of the intake duct 11 and the front-end portion 122a of the intake duct 12.

(7) It is preferable that the intake duct 71 at least partially extends from the rear side toward the front side on the bottom side of the lower end E2 of the front seat 4.

(8) It is preferable that the upper end of the intake port 112a1 is provided on the top side of the upper end of the intake port 40a.

(9) It is preferable that the one or more covers include the front cover 30 forming a part of the exterior of the vehicle body.

(10) It is preferable that the dashboard 50 placed on the front side of the front seat 4 is provided, and the one or more covers include the inner cover 90 covered by the front cover 30 and attached to the front part 51 of the dashboard 50.

(11) It is preferable that the inner cover 90 forms the open space O opening in the lower part with the front part 51 of the dashboard 50, and the front-end portion 112a of the intake duct 11 and the front-end portion 122a of the intake duct 12 are placed within the open space O.

(12) It is preferable that the center console 20 adjacent to the front seat 4 with the select lever 21 for changing the transmission ratio of the CVT 10 provided therein is provided, and the intake duct 11 and the intake duct 12 at least partially extend immediately below the center console 20.

(13) It is preferable that the front-end portion 112a of the intake duct 11 and the front-end portion 122a of the intake duct 12 are connected to each other.

What is claimed is:
1. A vehicle comprising:
a seat on which a driver sits;
an engine at least partially located on a rear side of a front-end of the seat and a bottom side of a lower end of the seat;
a continuously variable transmission at least partially located on the rear side of the front-end of the seat and the bottom side of the lower end of the seat, and varying and outputting rotary power from the engine;
a first intake duct at least partially extending from a rear side toward a front side on the bottom side of the lower end of the seat, and having a first intake port in a front-end portion, and routing outside air taken in from the first intake port to the continuously variable transmission;
a second intake duct at least partially extending from the rear side toward the front side on the bottom side of the lower end of the seat, having a second intake port in a front-end portion, and routing the outside air taken in from the second intake port to the continuously variable transmission; and
one or more covers covering both the front-end portion of the first intake duct and the front-end portion of the second intake duct,
wherein the front-end portion of the first intake duct and the front-end portion of the second intake duct are located on a front side of the front-end of the seat and a top side of the lower end of the seat.

2. The vehicle according to claim 1, wherein the first intake port and the second intake port are provided at heights crossing a common horizontal plane.

3. The vehicle according to claim 1, wherein the front-end portion of the first intake duct and the front-end portion of the second intake duct are placed to cross a common plane along a left-right direction.

4. The vehicle according to claim 1, wherein a direction in which the first intake port opens and a direction in which the second intake port opens are different.

5. The vehicle according to claim 1, further comprising an exhaust duct having a connection port connected to a case of the continuously variable transmission in a front-end portion, having an exhaust port in a rear-end portion, and exhausting a gas within the case of the continuously variable transmission to outside of the continuously variable transmission via the connection port and the exhaust port.

6. The vehicle according to claim 1, further comprising an air cleaner having a third intake port for taking in outside air and sending the outside air taken in from the third intake port to the engine via a third intake duct, wherein the air cleaner is provided on the front side of the front-end portion of the first intake duct and the front-end portion of the second intake duct.

7. The vehicle according to claim 6, wherein the third intake duct at least partially extends from the rear side toward the front side on the bottom side of the lower end of the seat.

8. The vehicle according to claim 6, wherein an upper end of the first intake port is provided on a topside of an upper end of the third intake port.

9. The vehicle according to claim 1, wherein the one or more covers include a front cover forming a part of an exterior of a vehicle body.

10. The vehicle according to claim 9, further comprising a dashboard placed on the front side of the seat, wherein the one or more covers include an inner cover covered by the front cover and attached to a front part of the dashboard.

11. The vehicle according to claim 10, wherein the inner cover forms an open space opening in a lower part with the front part of the dashboard, and the front-end portion of the first intake duct and the front-end portion of the second intake duct are placed within the open space.

12. The vehicle according to claim 1, further comprising a center console adjacent to the seat with a select lever for changing a transmission ratio of the continuously variable transmission provided therein, wherein the first intake duct and the second intake duct at least partially extend immediately below the center console.

13. The vehicle according to claim 1, wherein the front-end portion of the first intake duct and the front-end portion of the second intake duct are connected to each other.

* * * * *